(12) United States Patent
Lindberg et al.

(10) Patent No.: US 10,891,415 B1
(45) Date of Patent: Jan. 12, 2021

(54) METHOD, SYSTEM, AND PRODUCT FOR GENERATING RADIAL BUMP PATTERNS

(71) Applicant: Cadence Design Systems, Inc., San Jose, CA (US)

(72) Inventors: Björn Axel Lindberg, Munich (DE); Jean-François Alain Lepère, Le Versoud (FR); Vladimir Papic, Saint Nazaire les Eymes (FR)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/432,835

(22) Filed: Jun. 5, 2019

(51) Int. Cl.
*G06F 30/392* (2020.01)

(52) U.S. Cl.
CPC .................. *G06F 30/392* (2020.01)

(58) Field of Classification Search
CPC ........................................ G06F 30/392
See application file for complete search history.

(56) References Cited

U.S. PATENT DOCUMENTS

| | | | |
|---|---|---|---|
| 6,581,189 B1 | 6/2003 | Tain | |
| 6,793,500 B1 * | 9/2004 | Budell | H01L 23/49838 174/51 |
| 8,155,938 B2 | 4/2012 | Singhee et al. | |
| 8,601,415 B2 | 12/2013 | Moffitt | |
| 8,612,908 B2 | 12/2013 | Cooper et al. | |
| 8,806,418 B1 | 8/2014 | Jallepalli et al. | |
| 8,813,009 B1 | 8/2014 | Liu et al. | |
| 8,954,910 B1 | 2/2015 | Liu et al. | |
| 9,043,771 B1 | 5/2015 | Vardhan et al. | |
| 9,483,602 B2 | 11/2016 | Mcconaghy et al. | |
| 9,524,365 B1 | 12/2016 | Liu et al. | |
| 9,836,564 B1 | 12/2017 | Zhang et al. | |
| 10,083,257 B2 | 9/2018 | Kuo et al. | |
| 2005/0288918 A1 | 12/2005 | Chen et al. | |
| 2012/0046929 A1 | 2/2012 | Joshi et al. | |
| 2012/0091578 A1 * | 4/2012 | Chen | H01L 24/03 257/737 |
| 2012/0278050 A1 | 11/2012 | Hsiao et al. | |
| 2013/0226544 A1 | 8/2013 | Mcconaghy et al. | |
| 2013/0304439 A1 | 11/2013 | Van Der Velden | |

(Continued)

OTHER PUBLICATIONS

U.S. Appl. No. 16/027,231, filed Jul. 3, 2018.

(Continued)

*Primary Examiner* — Vuthe Siek
(74) *Attorney, Agent, or Firm* — Vista IP Law Group, LLP

(57) ABSTRACT

An approach is described for a method, system, and product for generating radial bump patterns. According to some embodiments, the approach includes determining parameters for radial pattern generation in a precomputing phase, creating a radial pattern in a second stage, and generating a layout from the radial pattern in the second stage before manufacture a device embodying the radial pattern. In some embodiments, the radial pattern comprises rings having a number of rows where bump instances are placed and rotated such that they are perpendicular to a radius from a common center line. Furthermore, in some embodiments, the number of rows in a ring is generated pursuant to a set value or dynamically generate based on one or more optimization metrics.

25 Claims, 14 Drawing Sheets

(56) References Cited

U.S. PATENT DOCUMENTS

2013/0326453 A1* 12/2013 Yu .................. G06F 30/398
716/115
2015/0278421 A1* 10/2015 Chiu .................. G06F 30/394
257/737
2016/0283629 A1 9/2016 Weckx et al.

OTHER PUBLICATIONS

Akkouche, Nourredine, et al. "Minimization of functional tests by statistical modelling of analogue circuits." 2007 International Conference on Design & Technology of Integrated Systems in Nanoscale Era. IEEE, 2007.
Zhang et al., Accelerating Monte Carlo Analysis at Advanced Nodes, Jun. 22, 2016, pp. 1-9. (Year. 2016).
Sengupta, Manidip, et al. "Application-specific worst case corners using response surfaces and statistical models." IEEE Transactions on Computer-Aided Design of Integrated Circuits and Systems 24.9 (2005): 1372-1380.
Sheather, Simon J., and Michael C. Jones. "A reliable data-based bandwidth selection method for kernel density estimation." Journal of the Royal Statistical Society: Series B (Methodological) 53.3 (1991): 683-690.
Sun, Shupeng, et al. "Fast statistical analysis of rare circuit failure events via scaled-sigma sampling for high-dimensional variation space." IEEE Transactions on Computer-Aided Design of Integrated Circuits and Systems 34.7 (2015): 1096-1109.
Zhang, Hong, et al. "Efficient design-specific worst-case corner extraction for integrated circuits." 2009 46th ACM/IEEE Design Automation Conference. IEEE, 2009.

* cited by examiner

FIG. 6

Antiradial Table 602:

| Angle | Antiradial Pitch |
|---|---|
| 60 | 136 |
| 51.5 | 137 |
| 45 | 138 |

Radial Table 604:

| Angle | Antiradial Pitch | Radial Pitch |
|---|---|---|
| 45 | 138 | 96.9 |
| 45 | 139 | 96.8 |
| 45 | 140 | 96.6 |

Ring Table 606:

| n x m | ri | ro |
|---|---|---|
| 100x5 | 2075 | 2523 |
| 101x5 | 2096 | 2544 |
| 102x5 | 2118 | 2565 |
| 103x5 | 2139 | 2587 |

Output Table 608:

| Radius | Number of Bumps | Offset | Nudge |
|---|---|---|---|
| 0 | 1 | 0 | 0 |
| 136 | 6 | 0 | 2 |
| 244 | 11 | 0 | 9 |
| 532 | 17 | 0 | 0 |
| 454 | 17 | 10.58 | 0 |
| 370 | 17 | 0 | 0 |
| 887 | 30 | 6 | 2 |
| 810 | 30 | 0 | 2 |
| 729 | 30 | 6 | 2 |
| 645 | 30 | 0 | 2 |
| 1249 | 47 | 3.82 | 2 |
| 1169 | 47 | 0 | 2 |
| 1088 | 47 | 3.82 | 2 |
| 1003 | 47 | 0 | 2 |

Sector Pattern
700A

Symmetric Spiral Pattern 700C

METHOD, SYSTEM, AND PRODUCT FOR GENERATING RADIAL BUMP PATTERNS

BACKGROUND

Semiconductor devices are used in a variety of electronic applications, such as personal computers, cell phones, digital cameras, and other electronic equipment, as examples. Semiconductor devices are typically fabricated by sequentially depositing insulating or dielectric layers, conductive layers, and semiconductive layers of material over a semiconductor substrate, and patterning the various material layers using lithography to form circuit components and elements thereon.

Dozens or hundreds of integrated circuits are typically manufactured on a single semiconductor wafer. The individual dies are singulated by sawing the integrated circuits along a scribe line. The individual dies are then packaged separately, in multi-chip modules, or in other types of packaging—e.g. wafer level packaging (WLPs), chip-on-wafer-on-substrate (CoWoS), and Flip-Chip (controlled collapse chip connection) packages.

The present invention relates generally to establishing a die connection bump layout for defining an interface between a die and a substrate, such as part of a packaging process. Packaging is a common practice in microprocessor design and fabrication in which a die (i.e., a microchip) is attached to a package. In general, the package provides the die with a lead system, physical protection, environmental protection, and heat dissipation. The primary function of the package is to provide a lead system that allows connection of the die to a circuit board or an electronic device. This connection is not normally made directly to a circuit board due to the fragility of metal conduction systems used to interconnect components within the die. Thus, die conductors generally terminate in larger bonding pads around a periphery of the die. The die bonding pads are electrically and mechanically connected to corresponding inner leads on the package. The package provides a metal conduction system from the inner leads to corresponding outer leads which are mechanically stronger that the die conductors.

Connections between the die bonding pads and the corresponding package inner leads can be established by a number of known methods including a flip-chip and bump method. In the flip-chip and bump method, a metal bump is deposited on each die bonding pad. When the die is flipped over and placed on the package, each metal bump connects to a corresponding package inner lead via a corresponding bump location. The mechanical and electrical connections between the die and the package are then established through a soldering process in which the metal bumps fuse with the inner leads of the package at an elevated temperature.

In order to establish these bump patters, computer aided design (CAD) tools for creating and validating electronic designs such as systems, chips, and other logical representations of items are used. An electronic design automation (EDA) system is one type of CAD tool for creating electronic designs.

EDA tools are often used for performing layout and verification, using some rule compliance verification techniques, and/or correction of rule violations in the then current layout. For instance, some layout processes enforce spacing rules used to avoid manufacturing devices that have unintended effects to create a correct by construction layout—e.g. shorts, electromagnetic interference, compliance with manufacturing tolerances, manufacturability of the shape. Additionally, once a layout has been created it may be reviewed in a verification process to identify errors or any design/process rule violations.

Generally, modern electronic devices are required to be made using these EDA tools. This is necessitated in part by the infrastructure that is used in the manufacture of these devices and in part because of the size of the elements that make up these devices, e.g. nanometer level features.

However, as more and more circuit elements are being created within devices the input/output requirements of these devices have also increased. Additionally, in some cases, the size of these devices might also decrease—e.g. semiconductors have gotten smaller while the number of connections those devices requires remained stable or has increased. Another issue that has developed is that current methods that ignore centrifugal variation and thermal expansion experienced during at least manufacturing sometimes fail due to the centrifugal variation. To account for this variation current techniques merely increase the spacing between bumps. However, this decreases the density of bumps which is undesirable.

Therefore, what is needed is an improved approach for generating radial bump patterns that account for thermal expansion and/or centrifugal forces during manufacture.

SUMMARY

Embodiments of the present invention provide a method, system, and product for generating radial bump patterns.

According to some embodiments, the approach includes determining parameters for radial pattern generation in a precomputing phase, creating a radial pattern in a second stage, and generating a layout from the radial pattern in the second stage before manufacture a device embodying the radial pattern. In some embodiments, the radial pattern comprises rings having a number of rows where bump instances are placed and rotated such that they are perpendicular to a radius from a common center point. Furthermore, in some embodiments, the number of rows in a ring is generated pursuant to a set value or dynamically generate based on one or more optimization metrics.

Other additional objects, features, and advantages of the invention are described in the detailed description, figures, and claims.

BRIEF DESCRIPTION OF FIGURES

In order that the present invention is better understood, some embodiments of the invention will now be described, by way of example only, with reference to the accompanying drawings.

FIG. 6 provides illustrative data structures for maintaining data according to one or more embodiments.

DETAILED DESCRIPTION

Embodiments of the present invention provide a method, system, and product for generating radial bump patterns.

According to some embodiments, the approach provides for generation of radial bump patterns comprising a plurality of rings one surrounding another where each ring has the same or different number of rows of bump instances with regard to other rings. Furthermore, within each ring, each row comprises the same number of bump instances. Additionally, each bump instance is oriented according to their position along a circumference along a circle and has an angle that corresponds to that position. For example, a bump instance located directly above a center point might have a rotational angle set to zero. Subsequent bump instance would then have rotational angles set such that a radius drawn through the bump instance would bisect each bump instance in the same way.

Figure 1A:
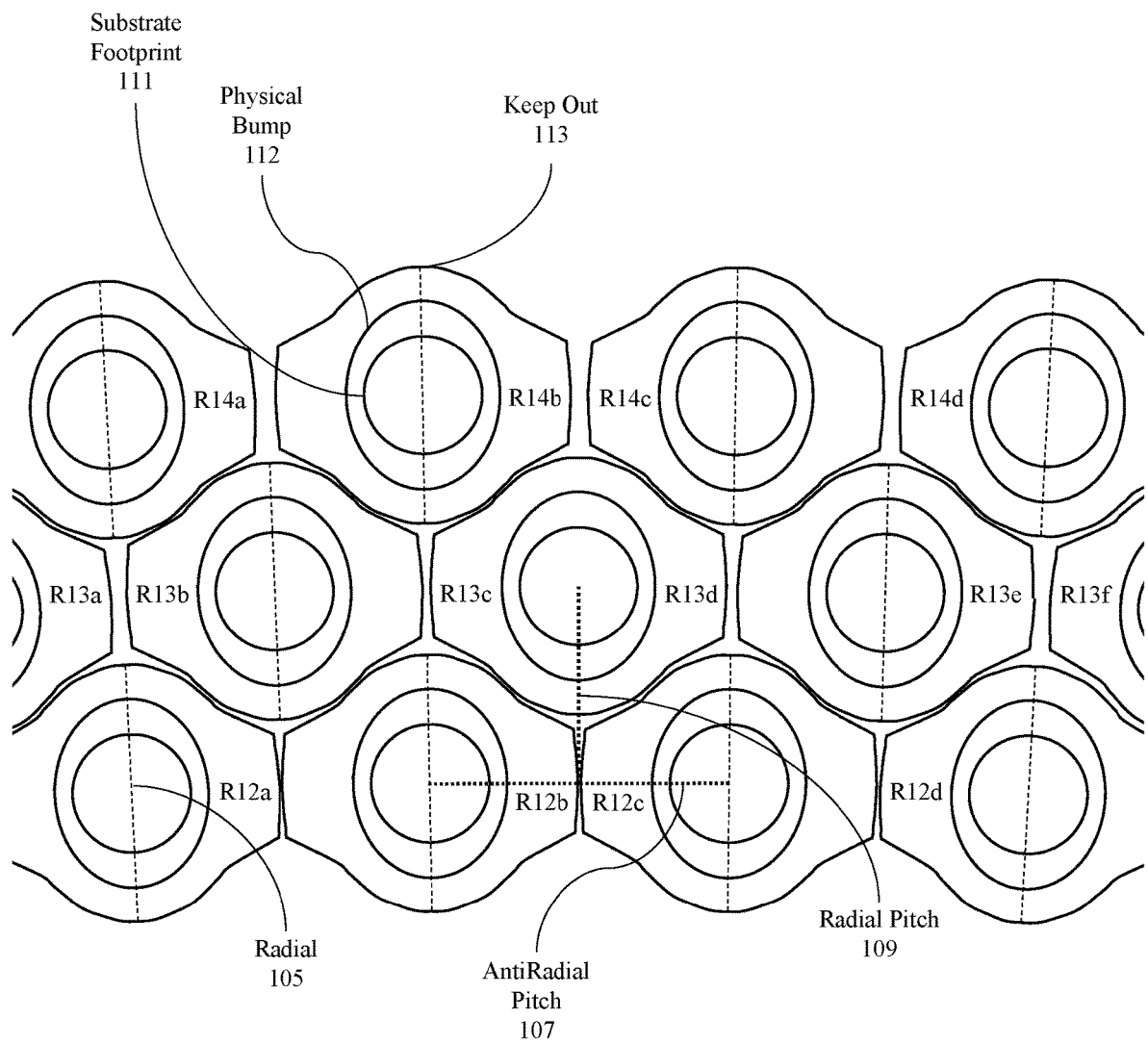
FIGS. 1A-1C illustrate some embodiments of the approach illustrated herein.
Figure 1B:
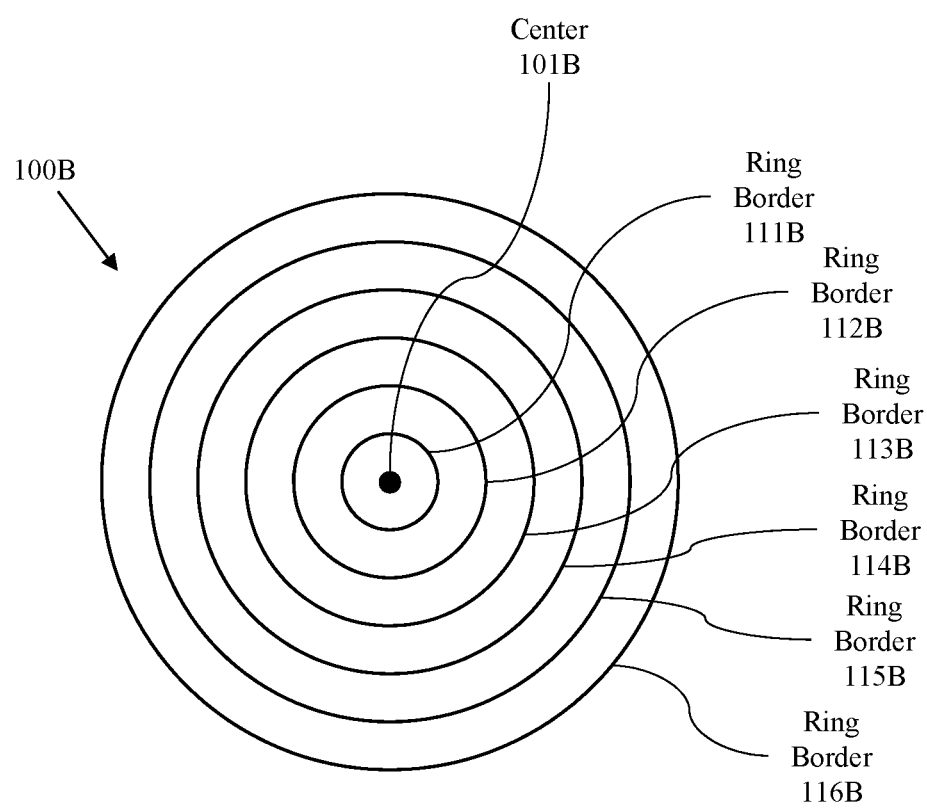
Figure 1C:
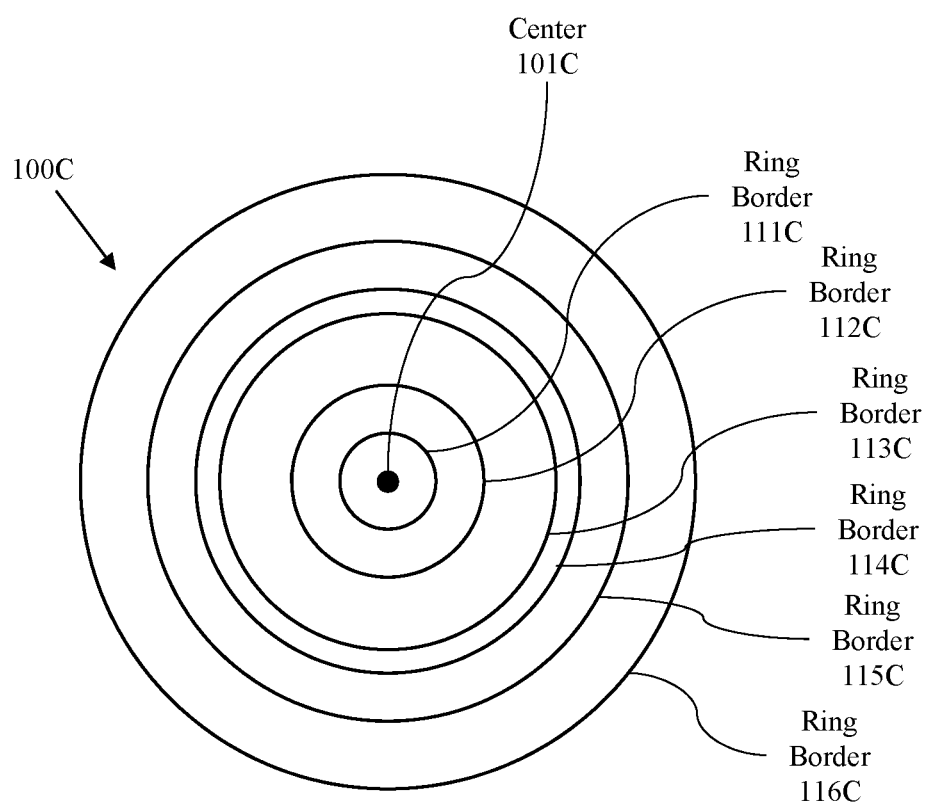

FIGS. 1A-1C illustrate some embodiments of the approach illustrated herein. FIG. 1A illustrates a plurality of bump instances and relevant features according to some embodiments. FIGS. 1B and 1C are directed to the overall arrangement of rings of bump instances according to some embodiments.

FIG. 1A illustrates a portion of a ring of bumps arranged in rows according to some embodiments. Specifically, FIG. 1A illustrates a portion of a ring having three rows of bump instances and being arranged in an offset manner to allow for nesting of the bump instances in one row with the bump instances of another row. Furthermore, FIG. 1A illustrates spacing parameters for the bump instances.

In some embodiments, a ring comprises a number of rows of bump instances. Within a ring, each row comprises the same number of bump instances all arranged according to the same radius from a shared center point. For instance, bump instances R12a-d are in a first row, bump instances R13a-f are in a second row, and bump instances R14a-d are in a third row. Furthermore, each row is offset with regard to the previous row. For instance, the first row of bump instances, represented by bump instances R12a-d might be thought of as having an offset of zero—e.g. the first bump instance is placed without an offset from a given starting point. However, the second row can be thought of as having a non-zero offset with respect to other rows. For instance, the second row might be offset such that the bump instances in the second row are centered between the bump instances in the first row to allow for nesting of bump instances such that adjacent rows can be nestled into voids that would otherwise exist without the offset—e.g. the second row is offset with respect to the first and third rows. Additionally, while not illustrated here, the bump instances for each row are placed around the entirety of a circle at the given radius as discussed below with regard to FIGS. 1B-1C.

Each bump instance comprises a central portion corresponding to a substrate footprint 111, a middle portion corresponding to a physical bump location 112, and a keep out 113 that defines a region that encompasses the substrate footprint 111 and the physical bump 112. Specifically, the keep out 113 defines an area which other structures should not intrude upon because they may cause an unwanted effect (shorts, electromagnetic interference, compliance with manufacturing tolerances, manufacturability of the shape). Additionally, each bump is associated with a radial 105 which is a logical construct used to fix the angles of the bump instances.

Each bump instance is also associated with an antiradial pitch 107 and a radial pitch 109. The antiradial pitch is the distance between the centers of two adjacent bump instances in the same row. Whereas the radial pitch is the distance between the center of a third bump in an adjacent row and a perpendicular line drawn between the first two adjacent bump instances. Creation of the pattern of the rings comprising one or more rows will be discussed further below.

FIG. 1B illustrates boundaries of a plurality of rings 100B where each ring has the same number of rows. In some embodiments, a number of rows in each of the rings is a fixed number, a user specified number, a number predetermined for one or more process parameters, or determined based on one or more rules. In some embodiments, the number of bump instances in each row of each ring is different from each other ring. For example, the rows in a first ring might have seven bump instances whereas the rows in a second rig have twelve bump instances.

For instance, at a center point 101B no bump instance is placed. However, between the center 101B and the ring border 111B a first ring comprising 5 rows of bump instances is placed. Between the ring border 111B and the ring border 112B a second ring comprising 5 rows of bump instances is placed. Similarly rings of 5 rows of bump instances are placed between ring border 112B and ring border 113B, ring border 113B and ring border 114B, ring border 114B and ring border 115B, and ring border 115B and ring border 116B.

FIG. 1C illustrates boundaries of a plurality of rings 100C where at least some rings have a different number of rows. Generally, the illustration of FIG. 1C is the same as that of FIG. 1B. However, whereas FIG. 1B illustrates ring boundaries for rings comprising the same number of rows of bump instances, FIG. 1C illustrates ring boundaries for rings that have differing numbers of rows of bump instances from one ring to another ring. In some embodiments, the number of rows from one ring to another ring is dynamical determined based one or more parameters such as the keep out shape, a user specified maximum or minimum number, based on one or more process parameters, or determined using one or more rules.

For instance, at a center point 101C no bump instance is placed. However, between the center 101C and the ring border 111C a first ring comprising 5 rows of bump instances is placed. Between ring border 111C and ring border 112C a second ring comprising 5 rows of bump instances is placed. However, between ring border 112C and ring border 113C a third ring comprising 8 rows of bump instances is placed, and between ring border 113C and ring border 114C a fourth ring comprising 2 rows of bump instances is placed. Finally, between ring border 114C and ring border 115C a fifth ring comprising 4 rows of bump instances is placed, and between ring border 115C and ring border 116C a sixth ring comprising 5 rows of bump instances is placed.

Figure 2:
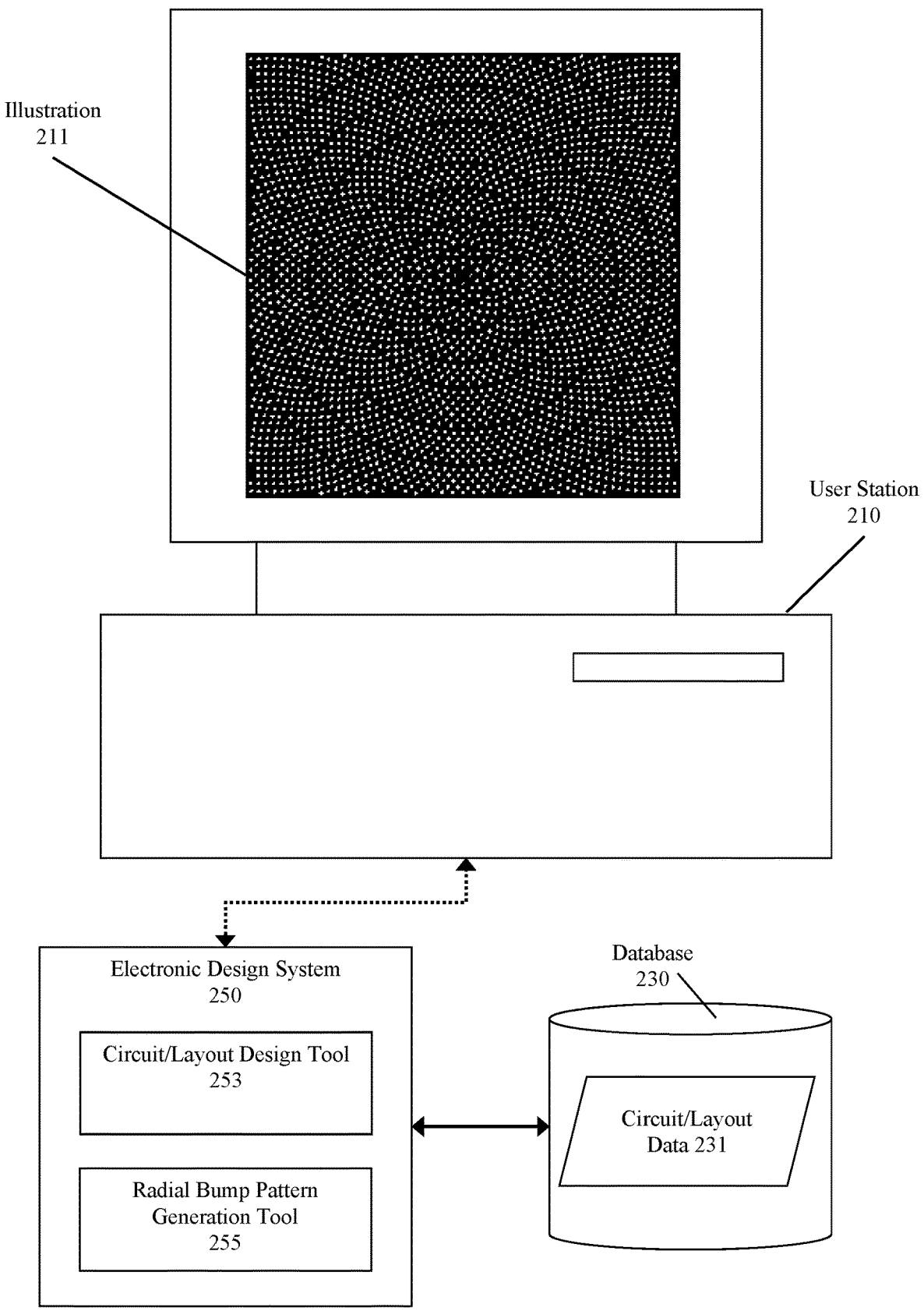
FIG. 2 illustrates an example system for generating radial bump patterns according to some embodiments.

FIG. 2 illustrates an example system for generating radial bump patterns according to some embodiments. The system includes a user station, a database having circuit/layout information, and an electronic design system having a circuit/layout design tool and a radial bump pattern generation tool.

The user station 210 includes or provides access to an electronic design system 250. For instance, the electronic design system 250 might be located on the user station 210, on a remote device access by the user station, or distributed across multiple devices. The user station 210 causes the execution of instructions for generating radial bump patterns according to some embodiments as disclosed herein. The user station 210 comprises any type of computing station that is useable to operate or interface with the database 230. Examples of such user stations include workstations, personal computers, or remote computing terminals. In some embodiments, the user station 210 comprises a display device, such as a display monitor, for displaying a user interface to users at the user station. The user station 210 also comprises one or more input devices for the user to provide operational control over the user station, such as a mouse or keyboard to manipulate a pointing object in a graphical user interface. In some embodiments, the graphical user interface includes tools for controlling and/or configuring the electronic design system such as configuring one or more rules/parameters for bump pattern creation.

Illustration 211 provides an example view of a radial bump pattern. As illustrated, the substrate corresponds to the black background, and the white dots correspond to each bump instance. Furthermore, in this illustration each ring comprises the collection of bumps surrounded by each black outline. For instance, the illustration shows eight rings where each of the rings have different numbers of bump instances in each row and where some of the rings have different numbers of rows. For example, if the central ring is the first ring, then the fourth ring has four rows while the fifth ring has seven rows. Furthermore, the seventh and eighth rows are only partial rows. Specifically, while the seventh row is completely contiguous (as in there is no discontinuity of the ring) some of the bump instances within the seventh ring fall outside of the defined area for the bump pattern, and thus have be culled. Additionally, the eighth ring is not contiguous, but instead exists only in the corners of the defined area for the bump pattern, where bump instances that fall outside of the defined area are again culled.

The electronic design system 250 as illustrated includes a circuit/layout design tool 253 and a radial bump pattern generation tool 255. In some embodiments, the various components, or their functions, of the electronic design system 250 are combined or separated into different components from those illustrated.

The circuit/layout design tool 253, comprises a tool for creating and or modifying a layout of a circuit design. For instance, circuit/layout design tools are generally known in the art and comprise different components for different types of design activities. For instance, one circuit design component might comprise an interface for accepting a hardware description or portion thereof as described by a hardware design language (e.g. Verilog, VHDL, etc.). Another circuit design component might comprise a circuit design component for manually manipulating/creating a circuit design using a circuit schematic. A layout design component might comprise a layout editor for modifying/creating layers of a design as they would be constructed on a semiconductor substrate. Generally, the circuit/layout design tool 253 operates on circuit/layout data (e.g. circuit/layout data 231) and can be used to generate a circuit layout used in semiconductor manufacturing. In some embodiments, the circuit/layout design tool 253 is modified to include an interface to control/access the radial bump pattern generation tool 255.

The system includes a database 230 which is illustrated as including circuit/layout data 231. In some embodiments, the database 230 comprises a single database with one or more subsets within that database for the circuit data and the layout data (e.g. circuit/layout data 231) as illustrated in FIG. 2. However, in some embodiments the database comprises multiple separate databases on different computing systems and/or in different locations connected via electronic communication links (e.g. wired and/or wireless networks). The system may further include database access modules for accessing and storing the data, whether stored at a single database or at multiple databases.

The circuit/layout data 231 comprises any types of representations of a design. For instance, the design data comprises any one or more of a hardware descriptive language design, a circuit schematic design, a circuit layout, or any combination thereof. The circuit/layout data 231 corresponds to at least layout data. In some embodiments, the circuit/layout data 231 includes multiple different bump patterns corresponding to one or more technology processes (commonly referred to as technology nodes).

Figure 3:
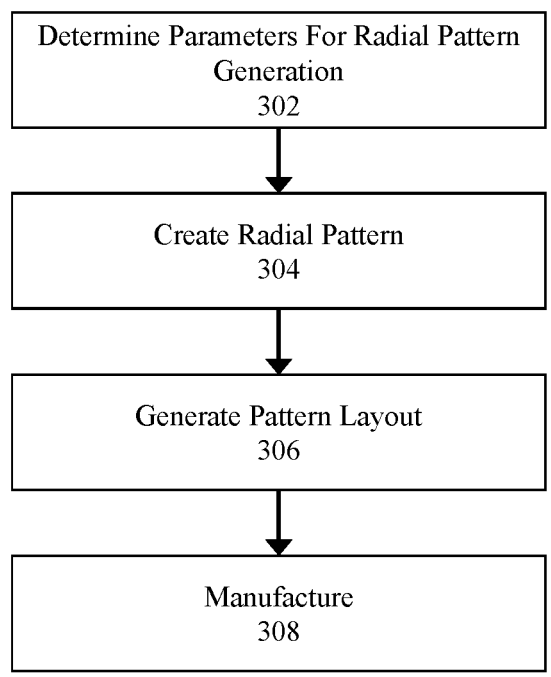
FIG. 3 illustrates a flow for generating radial bump patterns according to some embodiments.

FIG. 3 illustrates a flow for generating radial bump patterns according to some embodiments. Generally, the flow includes generation of relevant parameters for the radial pattern generation, creation of a radial pattern, generation of a pattern layout, and manufacture of a device having the generated pattern layout.

Figure 4A:
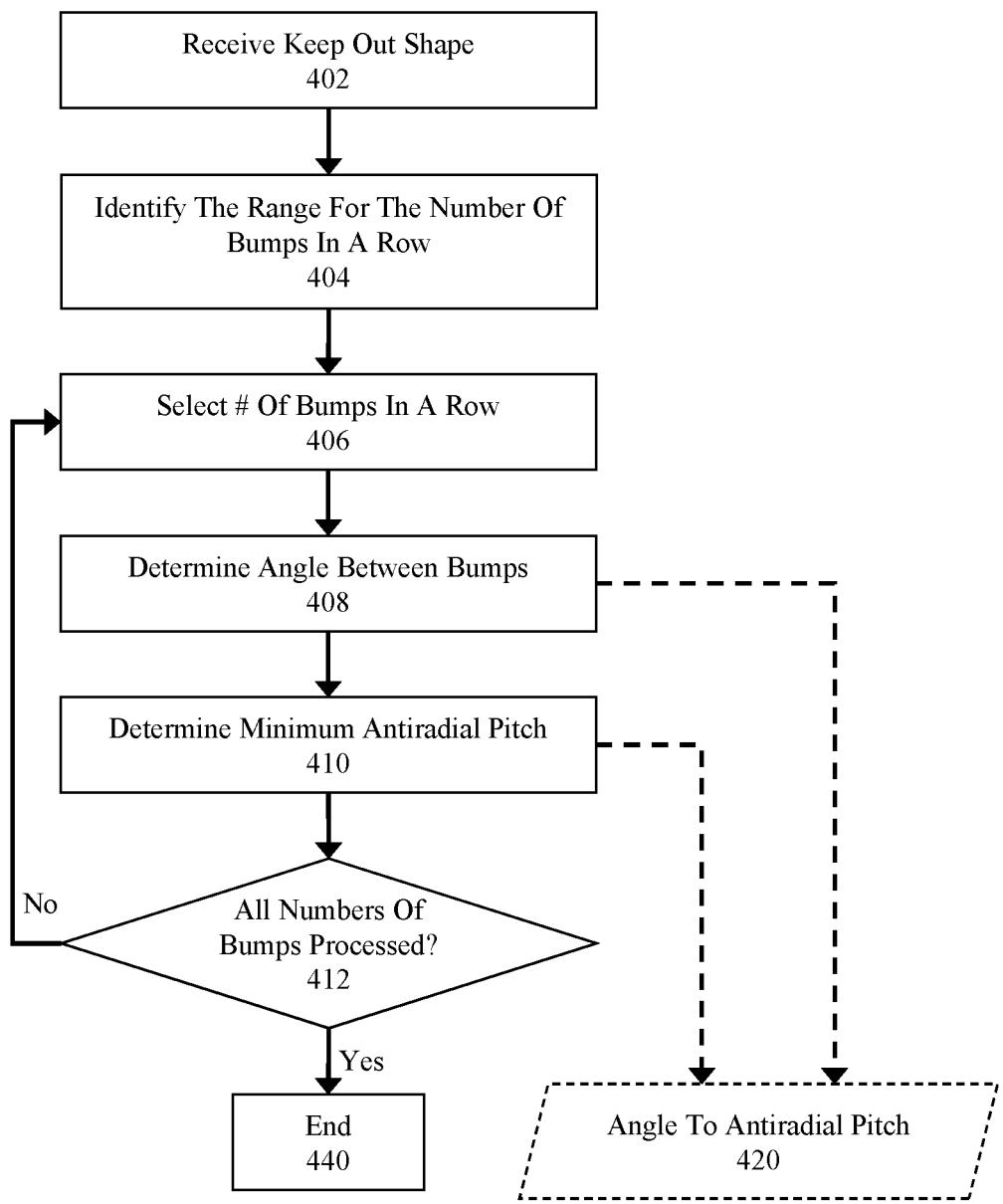
FIGS. 4A-4B illustrate a flow of an approach to generate parameters for the radial pattern generation illustrated in FIG. 3.
Figure 4B:
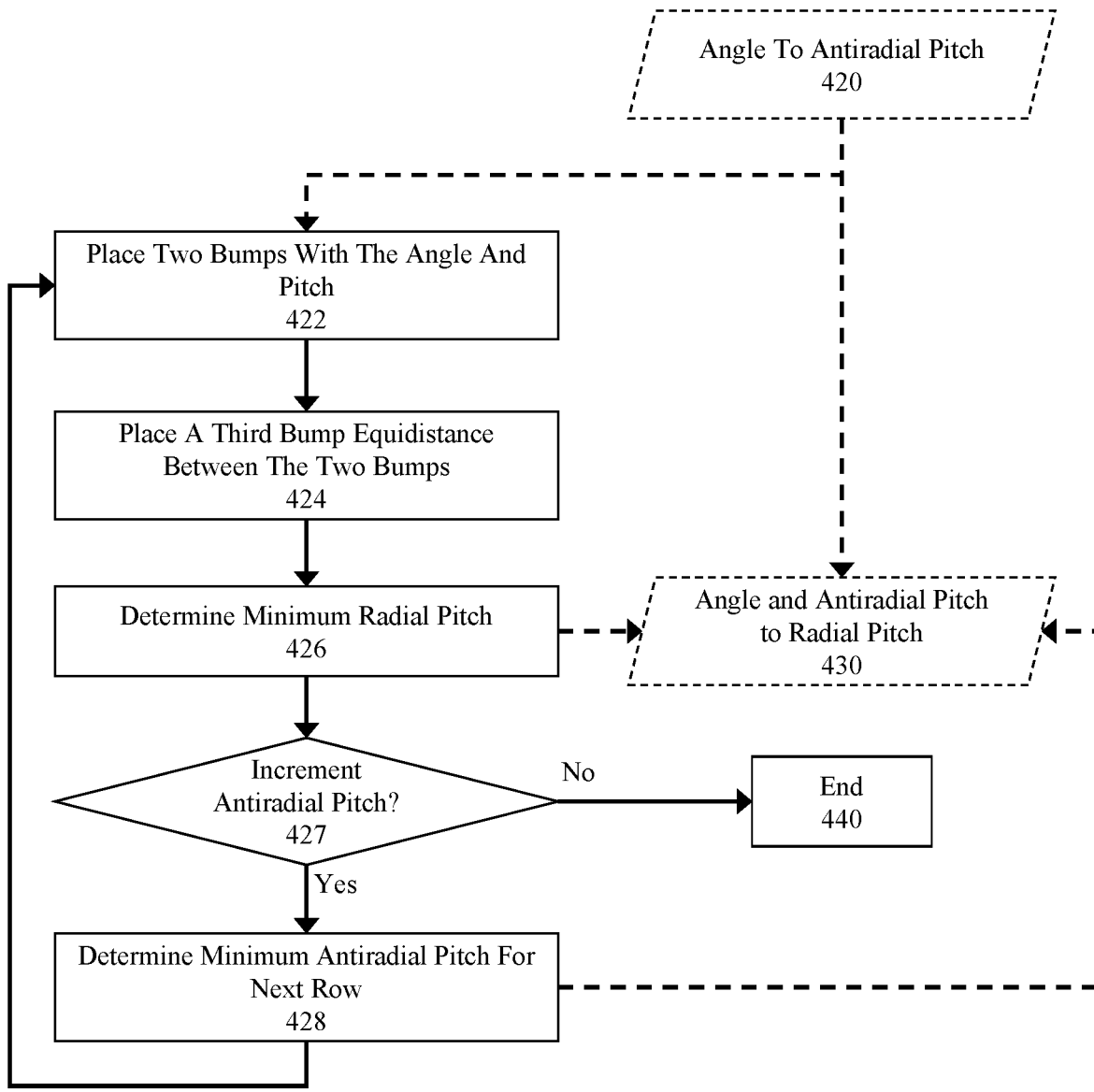

At 302, parameters for radial pattern generation are determined. For instance, the parameters, might comprise the actual/minimum/maximum number of rows in a ring, an actual/minimum/maximum number of rings, whether the pattern should be mirrored (e.g. the same across one or more axes), the minimum antiradial pitches between adjacent bump instances in a row, a number minimum radial pitches at corresponding antiradial pitches and angles, or any other parameters that can be precomputed. FIGS. 4A-4B provide an illustrative approach to radial pattern parameter determination according to some embodiments.

At 304, a radial pattern is created. For instance, a specification indicating the positioning of rows (e.g. the distance from a common center point), a rotational offset of a row for nesting, and a number of bump instances to be placed in a row. Furthermore, in some embodiments, a nudge value might be included, where each row in a ring is shifts in the nudge direction by the nudge amount. Radial pattern creation will be discussed further in regard to FIGS. 5A-6.

At 306, the radial pattern is converted into an actual layout. For instance, the pattern can be used to determine specific locations and rotations of bump instances for each bump specified by the radial pattern. Once this is created, a device (e.g. flip-chip) having the created layout of bump instances can be manufactured to comprise a physical embodiment of the layout at 308.

FIGS. 4A-4B illustrate a flow of an approach to generate parameters for the radial pattern generation illustrated in FIG. 3. Generally, this process includes determining the minimum antiradial pitches and radial pitches for adjacent bumps at one or more angles.

FIG. 4A illustrates an approach for determining minimum antiradial pitches according to some embodiments.

The process starts at 402, where a keep out shape is received. For instance, a keep out shape might be hand drawn by an engineer or generated automatically based on one or more rules. At 404, a range is determined for the possible numbers of bumps within any row. For instance, a maximum package/substrate dimension might be used to determine the maximum possible numbers of bumps within a row. To illustrate, rectangular substrates have a largest radius between their center and a corner, at least in the context of this application where radial patterns are generated that account for centripetal forces. Thus, the circumference of a circle with a radius from a center point to a corner might be divided by the width, possibly divided by 2, of the keep out shape and used as maximum number of bump instances.

At 406 a number of bump instances in a row is selected for processing—e.g. as part of iterating though a loop having some number n that is incremented or decremented through a range starting or ending at one and ending or starting at the maximum number of bump instances respectively. At 408, the angle between each bump instance is determined. For instance, if a number of bump instances of 100 is selected then each bump can be thought of as have an angle between them of 3.6 degrees. Thus, a first bump might have an angle of zero*3.6, a second bump has an angle of 1*3.6, a third bump has an angle of 2*3.6, and so on. Thus, the total angles between the bumps adds up to 360, but each bump differs from adjacent bumps by only 3.6 degrees.

At 410 a minimum antiradial pitch is determined. For instance, if the keep out shape is hand drawn then the minimum antiradial pitch can be determined by placing two bump instances on a layout space having that angular relationship (e.g. a first bump instance with a rotation of zero degrees, and a second bump instance with a rotation of 3.6 degrees) and moving the bump instances back and forth using a binary search technique to determine the closest point where they do not overlap at a given resolution. Since the difference in the angles between bump instances is constant for each number of bump instances in a row, then for any given number of bump instances within a row, an angle and a minimum antiradial pitch can be determined.

The angles and antiradial pitches might be stored in an angle to antiradial pitch structure 420 that maps angles to minimum antiradial pitches, such as in a table, a linked list, an ordered list, or any other data structure.

At 412 a determination is made as to whether all numbers of bumps in a row have been processed. If all the numbers of bumps in a row have not been processed, the flow returns to 406 where a different number of bumps in a row is selected. However, if all the numbers of bumps in rows have been processed, the flow ends at 440.

FIG. 4B illustrates an approach for determining minimum radial pitches for bumps placed with corresponding angular relationships and pitches.

The process starts at 422 where two bump instances are placed on a layout space having an angular relationship and a pitch—e.g. determined at 408 and 410. For instance, each entry in the angle to minimum antiradial pitch table 420 might be used to trigger processing of the flow illustrated in FIG. 4B. However, is some embodiments, subsequent antiradial pitches determined for subsequent rows within a ring can be used to trigger the process to find minimum radial pitches.

At 424, a third bump is placed having a center point equidistance between the two bumps and an angle halfway in between the angle of the first bump instance and the second bump instance (e.g. if the first bump instance is at zero degrees, the second bump instance is at 3.6 degrees, then the third bump instance will be at 1.8 degrees). Then similar to the process described at 410, the minimum radial pitch is determined at 426 by moving the third bump up/down in a binary search process until the closest point is identified at a given resolution (e.g. one corresponding to the process to be used). This minimum radial pitch may then be stored in an angle and antiradial pitch to radial pitch data structure at 430. For instance, data structure 430 might comprise a table, a linked list, an ordered list, or any other data structure.

At 427, a determination is made as to whether the antiradial pitch should be incremented. For instance, if the antiradial pitch is less than then twice the width of the bump instances the pitch could be incremented. However, if the antiradial pitch is not to be incremented then the process ends at 440. In contrast, if the antiradial pitch is to be incremented then the process continues at 428. For instance, at 428, the antiradial pitch could be incremented to the antiradial pitch for bump instances in the row of the third bump of which the radial pitch was just computed, or by a default value corresponding to the resolution of the process the bump instances are to be deployed with. Subsequently, the process returns to 422 where two new bump instances are placed having the same angle (the angular differences stay constant for rows having the same number of bump instances) but the newly updated antiradial pitch and the flow is repeated. Thus, each angle might be associated with a minimum antiradial pitch and a minimum radial pitch. Additionally, each angle might also be associated with antiradial pitches greater then the minimum antiradial pitch and corresponding minimum antiradial pitches for the non-minimum antiradial pitches.

Figure 5A:
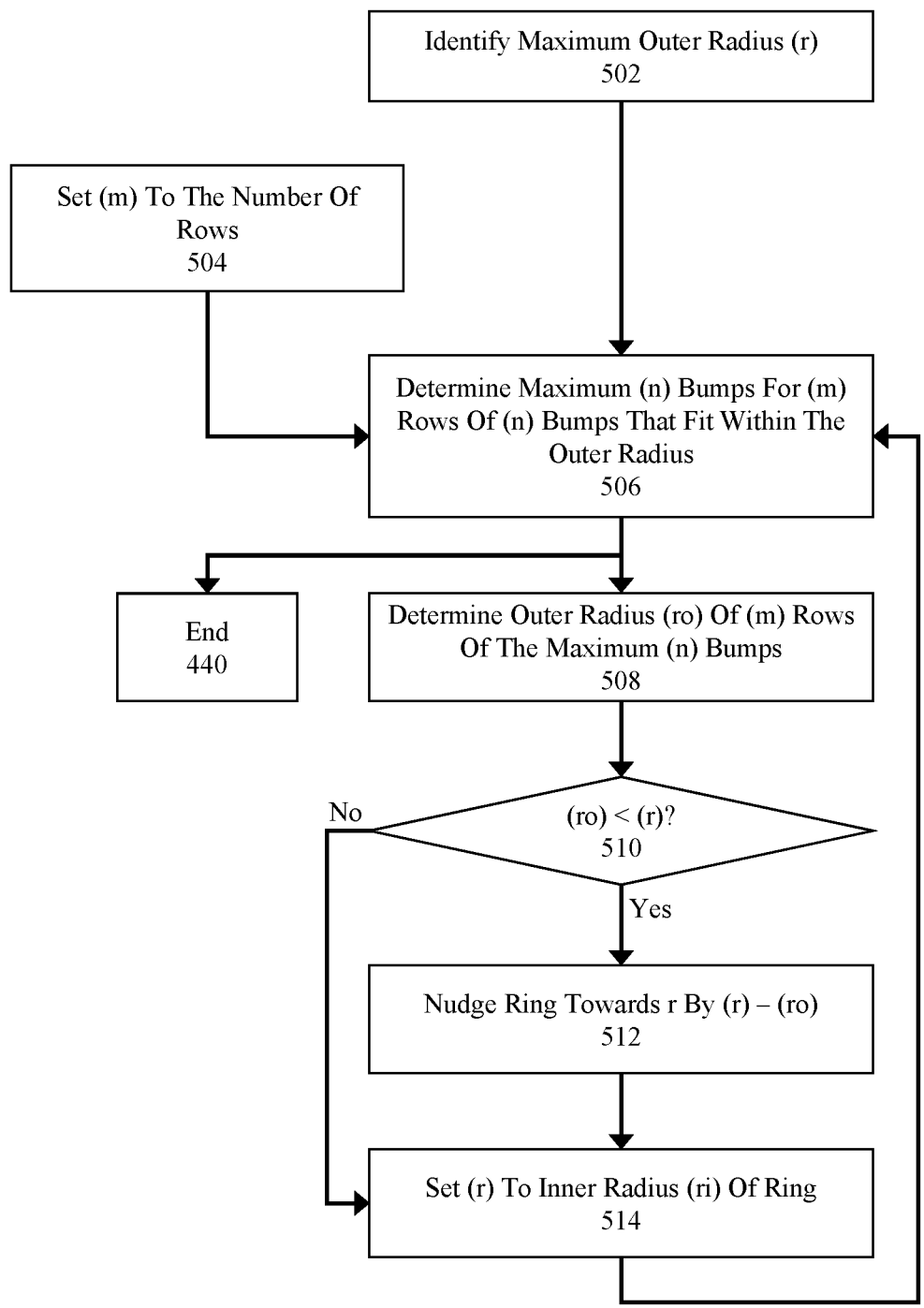
FIGS. 5A-5B illustrate a flow of approaches for creating radial patterns illustrated in
FIG. 2.
Figure 5B:
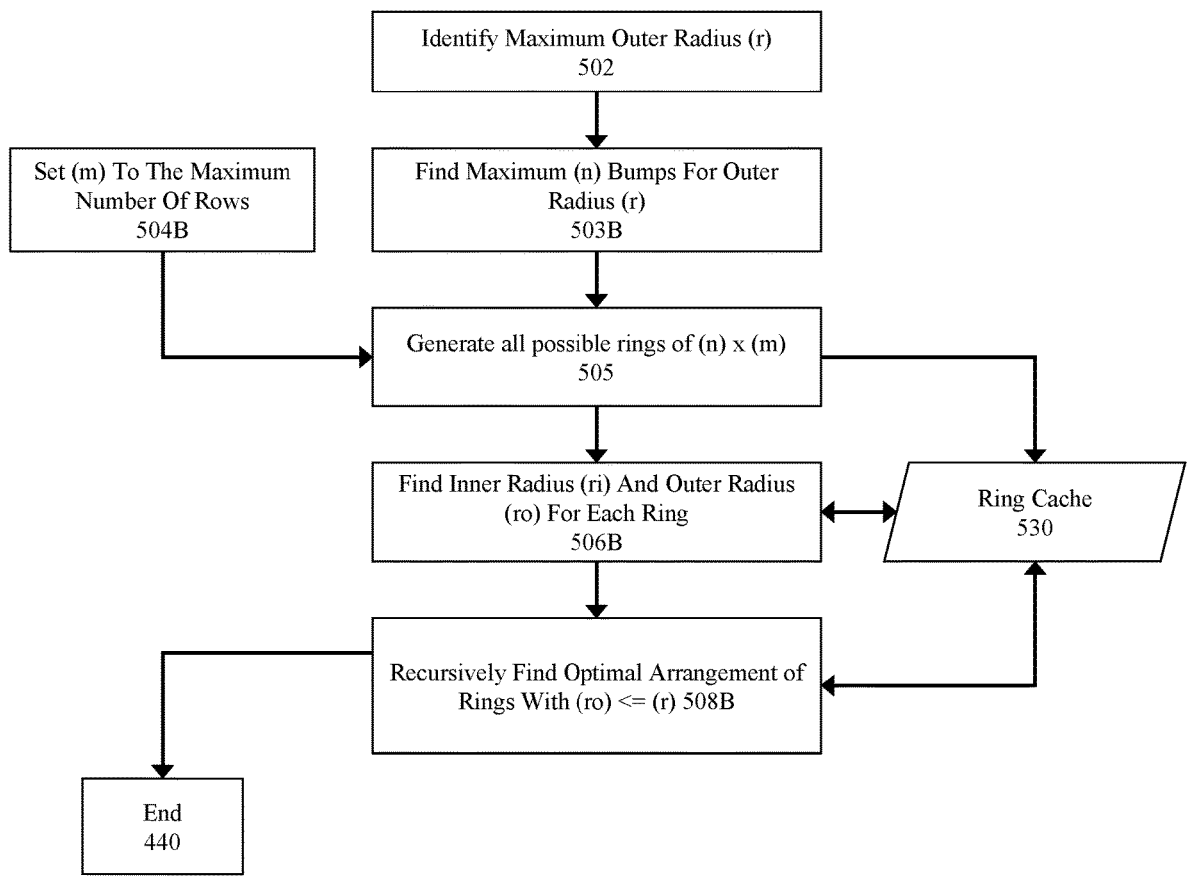

FIG. 5A-5B illustrate a flow of approaches for creating radial patterns illustrated in FIG. 2 according to some embodiments. FIG. 5A is directed towards an approach to create a radial pattern comprising rings having the same number of rows. FIG. 5B is directed towards an approach to dynamically create a radial pattern comprising rings that may have differing numbers of rows in order to optimize the bump pattern.

FIG. 5A illustrates a process flow that generates rings having the same number of rows. Specifically, the process will generate an outermost ring and then generate successive outer most rings bound by the previously generated outermost rings.

For instance, at 502 a maximum outer radius "r" is identified. The radius might be identified in any number of ways. One particular method might comprise setting "r" to the largest radius that fits entirely within a particular substrate area for a corresponding center point. Another method might comprise setting "r" to the largest radius that can be fit between a center point of a substrate area and any border of that substrate area (e.g. from the center point to a border along an axis). At 504 a value "m" is received that defines the number of rows in each ring. The value "m" could be a user defined value, a default value, and/or a value corresponding to a particular process technology and/or bump shape.

At 506, a maximum number of "n" bumps for "m" rows of "n" bumps that fit within the outer radius is determined. For instance, the number of rows "m" might comprise 5 and the number of bumps in each ring might comprise "n" where "n" is decremented from a max value until the "m" rows all fit within "r" without violating any of the corresponding minimum antiradial pitches or minimum radial pitches. In some embodiments, each combination of "n" bumps and "m" rows are entered into a data structure the associates the "n" bumps in "m" rows with an inner and an outer radius. Subsequently, the process disclosed here might perform a lookup to simply identify the largest "n" bumps in "m" rows with an outer radius that fits within the given "r". Additionally, in some embodiments, "n" could be found using a binary search technique, at least for the first iteration. In subsequent iterations, the maximum "n" could be set to "n"−1 of the last ring. For example, a first row is defined using the angle to antiradial pitch mappings stored at 420 to generate the smallest radius row of "n" bumps. The remaining "m"–1 rows of "n" bumps are then defined using the angle and antiradial pitch to radial pitch values stored at 430. One particular benefit to this technique is that it allows computations to be performed prior to the need for them to arise (See FIGS. 4A-4B). For instance, the antiradial and radial pitch mappings can be determined days or even weeks before a device (e.g. flip-chip) is ready for bump pattern generation. These values can then be used by a designer to evaluate multiple different bump pattern parameters. Regardless, eventually there will not be any "n" such that "m" rows of "n" instances can be placed inside the available space. When this happens, the process will end at 440.

At 508, the outer radius "ro" of the "m" rows of the maximum number of "n" bump instances is determined. Generally, if the computations at 506 were done correctly "ro" will be less then or equal to "r". If "ro" is <"r" then at 512 a value is determined that specifies a nudge, or shifting, of the current ring of "n" bump instances and "m" rows towards "r". For instance, the nudge value comprises "r"–"ro".

At 514, reached either from 512 or 510, "r" is set to the inner radius "ri" of the current ring of "n" bump instances and "m" rows that accounts for the nudge value(s). While likely small, each nudge value adds to the previous nudge value, the cumulative effects of which may allow for a ring with more bump instances per row then would otherwise have been possible. Finally, the processes at 506 are repeated as previously discussed using the new value for "r" comprising the inner radius "ri" of the last ring that was defined.

FIG. 5B illustrates a process flow that generates rings having dynamically determined numbers of rows in each ring which may differ from ring to ring. The process illustrated here provides for a recursive process to generate rings that leverages a caching structure.

As an initial matter, the discussion of 502 in FIG. 5A applies to FIG. 5B. However, 504B defines only a maximum number of "m" rows which is primarily to avoid wasting processing resources (e.g. memory, I/O and processor cycles), and 503B finds the maximum number of "n" bumps that would fit in the outer radius for the same reason. At 505 all possible rings of "n" bumps and "m" rows are generated for the maximum "n" and "m". As previously discussed, this can be accomplished using the angle to antiradial pitches from 420 and the angle and antiradial pitch to radial pitches from 430. Generally, as the number of rows increases, the antiradial pitch between bump instances will increase. Eventually, the antiradial pitches will get so large that it would be more efficient to start another ring where rows have a greater number of bump instances instead of creating another row having the same number of bumps. As a result, merely increasing the number of rows is not likely to result in an optimal bump pattern.

To find the optimal arrangement, the process first finds the inner radius "ri" and outer radius "ro" for each unique ring of "n" bumps by "m" rows at 506B. The rings and radii can be stored in a ring cache 530.

Subsequently, at 508B, a recursive process is executed to find the optimal arrangement of rings for "ro". For example, at a given radius (e.g. "ro") all possible rings that will fit in the radius are identified. Then, for each possible ring the recursive process is again called for each ring's inner radius "ri". Likewise, the recursive processes each recursively call the recursive process until eventually a smallest inner radius is identified such that no further inner radii can be identified. Then, each instance of the recursive process begins returning the optimal ring(s) within its outer radius. Additionally, as each optimal arrangement is identified for each radius, the results are cached in the ring cache 530. In this way, subsequently processed instances of the recursive process that correspond to a previously optimized inner radius can be retrieved without additional computations being required. Likewise, as each of the recursive processes return optimal solutions, the optimal solutions for the next larger radius can be determined using the optimal results for the inner radius of that ring corresponding to the original recursive call. For instance, the optimal solution for the current recursive function is the optimal solution for the inner radius plus the optimal solution between the inner radius and the outer radius. In this way, all arrangements of rings and rings inside those rings are considered and selected for optimal density at each radius. In some embodiments, each of the recursive processes is also analyzed/processed at 510 and 512 as discussed above to determine nudge factors for each of the rings.

FIG. 6 provides illustrative data structures for maintaining data according to one or more embodiments. Specifically, FIG. 6 provides an illustration of possible data structures embodied as tables.

For instance, an antiradial table 602 could be maintained for storing associations between angles and minimum antiradial pitches. Additionally/Alternatively, a radius and number of bumps could be associated with minimum antiradial pitches because the angle can be derived from the radius and number of bumps within a row. For instance, antiradial table 602 illustrates three angles and their corresponding antiradial pitches—e.g. the first entry shows an angle of 60 degrees and an antiradial pitch of 136, the second entry shows an angle of 51.5 degrees and an antiradial pitch of 137, and the third entry shows an angle of 45 degrees and an antiradial pitch of 138.

Another table (see radial table 604) could be used to associated angles and antiradial pitches to radial pitches. For instance, a unique combination of an angle and an antiradial pitch for a given keep out will correspond to a minimum radial pitch. Additionally, while the antiradial table 602 associates angles to minimum antiradial pitches, the radial table 604 associates combinations of both angles and minimum antiradial pitches to radial pitches. Additionally, the angles and antiradial pitches for second, third, etc. rows where the antiradial pitches are greater than the minimum antiradial pitch might also be associated with radial pitches for subsequent rows. Radial table 604 illustrates this single angle to multiple antiradical pitches and minimum radial pitches. For instance, the radial table 604 illustrates three entries for the same angle, but different antiradial pitches and thus different minimum radial pitches—e.g. while all three entries illustrated correspond to a 45 degree angle, the antiradial pitches are 138, 139, and 140 and correspond to radial pitches of 96.9, 96.8, and 96.6 respectively.

Ring table 606 provides an illustration of an example portion of a ring table that might be maintained in the ring cache or on a non-volatile storage device for a given bump and process technology. For instance, the ring table might comprise a first column containing entries defining a number of bump instances per row and a number of rows in a particular ring. Additionally, subsequent columns (e.g. second and third columns) might define an inner radius "ri" and an outer radius "ro" for the corresponding ring defined in the first column. For example, the second row in the ring table 606 illustrates a ring having 100 bump instances per row and 5 rows, where the inner radius is 2075 and the outer radius is 2523.

The output table 608, comprises an embodiment of the output of the create radial pattern process 304. For instance, a pattern might be defined by a series of entries in a table, where each entry corresponds to a row and each row corresponds to a radius in a first column, a number of bumps in a second column, an offset in a third column, and a nudge value in a fourth column. For instance, the output table 608 illustrates an output for a radial pattern having dynamically determined numbers of rows per ring, where the first three rings comprise one row each, the fourth ring comprises three rows, and the fifth and sixth rows comprise four rows.

Figure 7A:
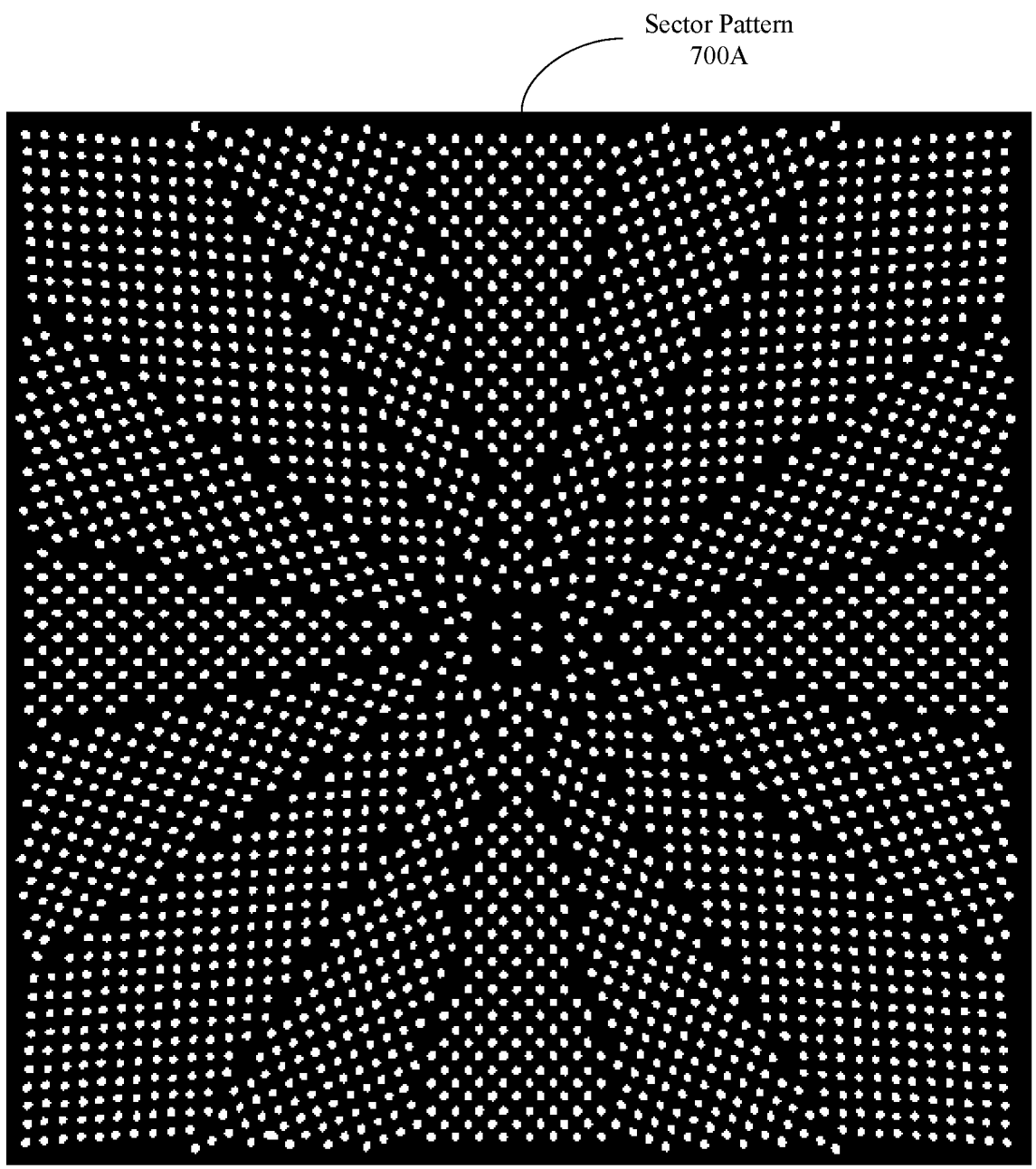
FIGS. 7A-7C provide alternative bump patterns according to some embodiments.
Figure 7B:
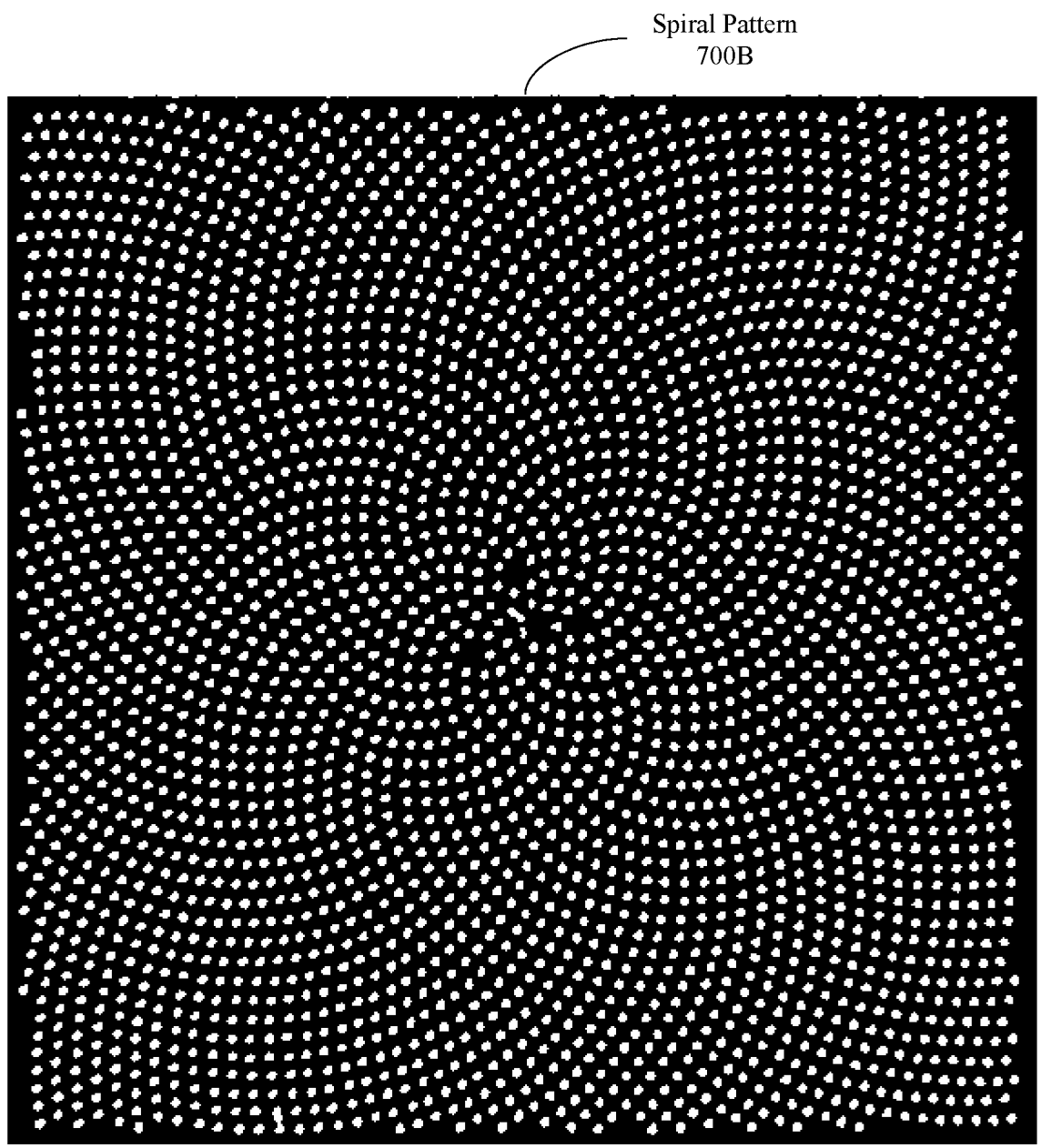
Figure 7C:
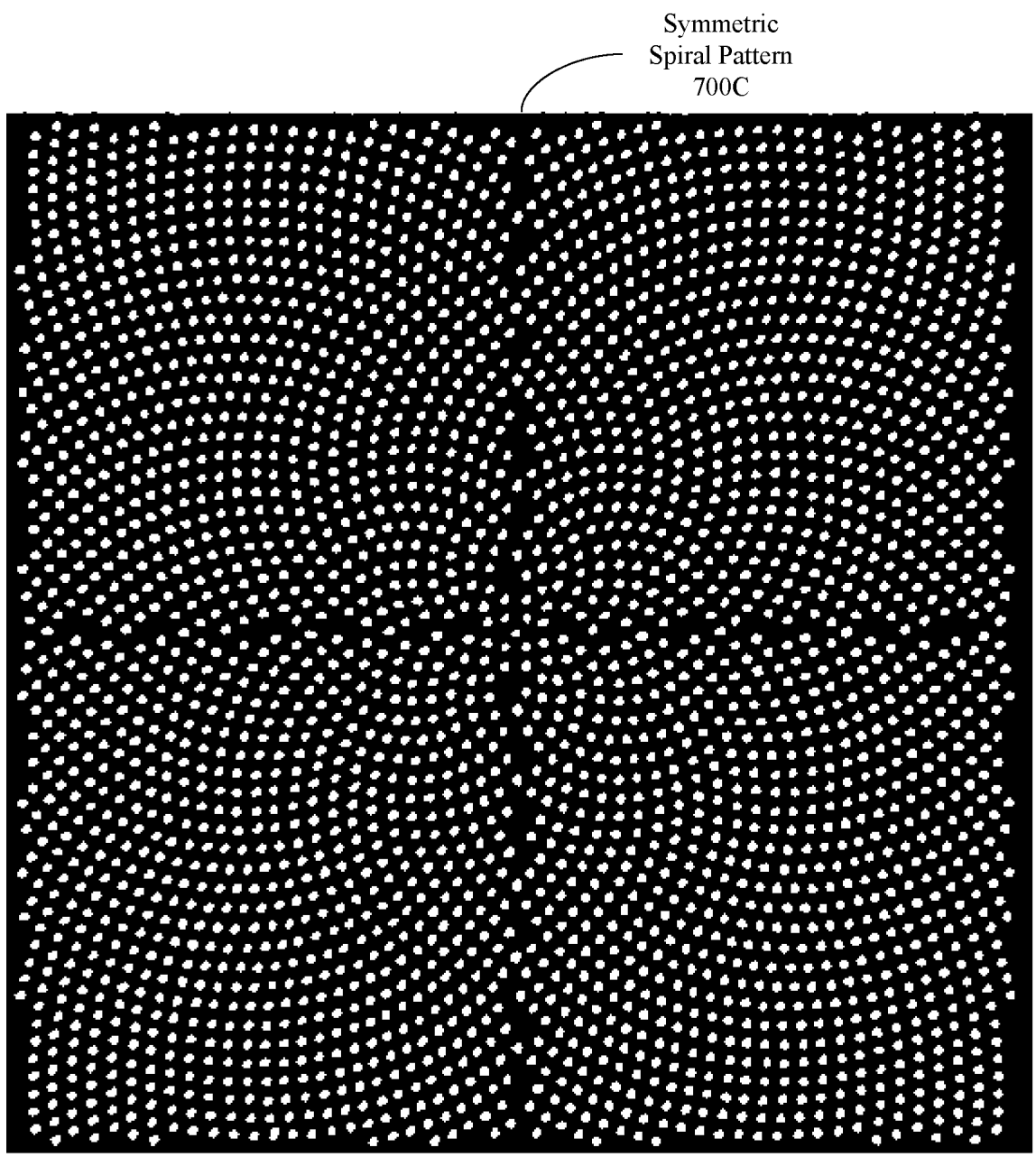

FIGS. 7A-7C provide alternative bump patterns according to some embodiments. While these bump patterns might not have the same number of bumps within a given area, they may nonetheless be desirable depending on the circumstances.

FIG. 7A illustrates a sector based approach to pattern generation. Generally, this approach presumes a consistent starting point for the bump patterns but then adjusts the bump pattern to generate the subset of the bump pattern for each portion of the layout area.

For instance, the illustrated sector based pattern is generated by dividing the corresponding area into a number of sectors (here sixteen sectors). Then a bump pattern is generated using conventional techniques that do not account for centripetal variation. Then, in order to account (or at least partially account) for the centripetal variation, the conventional bump pattern is rotated corresponding to their angular relationship to the center of the area for each sector. Thus, a bisecting line has an angle with respect to an origin point. This angle is the angle that the conventional bump pattern is rotated to generate the bump pattern for each sector.

FIG. 7B illustrates a spiral pattern. For instance, the spiral pattern illustrated might be generated using a Vogal spiral. Generally, a vogal spiral can be mathematically represented. Here the points of the spiral correspond to bump instance, and each bump instance is rotated such that its angle corresponds to that of a radius from a center point of the layout area.

FIG. 7C illustrates a symmetric spiral pattern based approach to pattern generation. Generally, this means that the pattern is mirrored across axis (e.g. x, y, or x and y) such that each quadrant will have the same exact pattern but where each portion is rotated ninety degrees with respect to the previous portion.

For instance, a spiral pattern is generated for a first quadrant that comprises a number of bump instances arranged in a spiral. Subsequently, the spiral pattern from the first quadrant is mirrored to the remaining quadrants. Thus, only a portion of the spiral pattern needs to be generated from scratch and the remaining portions can be generated by mirroring/rotating the original portion multiple times.

System Architecture Overview

Figure 8:
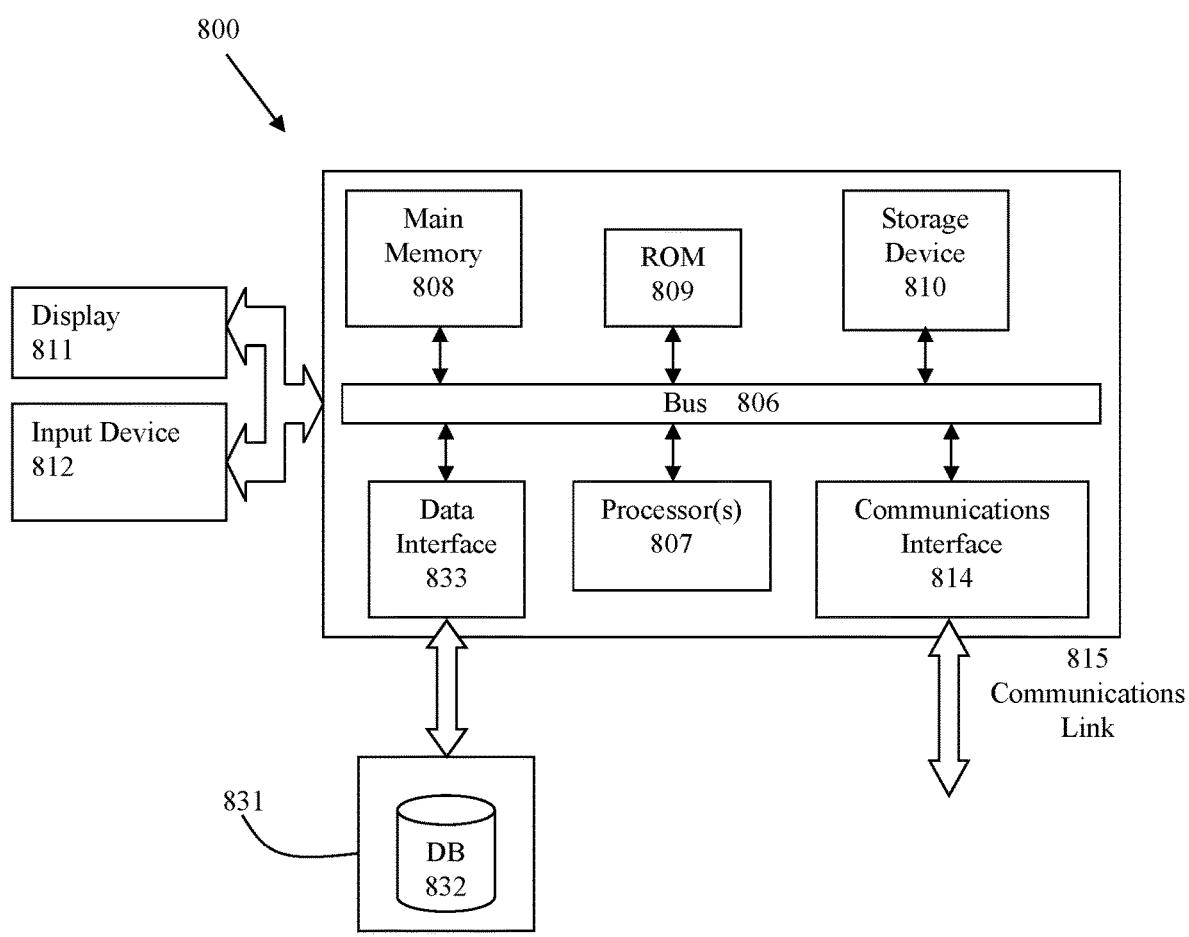
FIG. 8 shows an architecture of an example computing system with which the invention may be implemented.

FIG. 8 shows an architecture of an example computing system with which the invention may be implemented. Computer system 800 includes a bus 806 or other communication mechanism for communicating information, which interconnects subsystems and devices, such as processor 807, system memory 808 (e.g., RAM), static storage device 809 (e.g., ROM), disk drive 810 (e.g., magnetic or optical), communication interface 814 (e.g., modem or Ethernet card), display 811 (e.g., CRT or LCD), input device 812 (e.g., keyboard), and cursor control.

According to one embodiment of the invention, computer system 800 performs specific operations by processor 807 executing one or more sequences of one or more instructions contained in system memory 808. Such instructions may be read into system memory 808 from another computer readable/usable medium, such as static storage device 809 or disk drive 810. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 807 for execution. Such a medium may take many forms, including but not limited to, non-volatile media and volatile media. Non-volatile media includes, for example, optical or magnetic disks, such as disk drive 810. Volatile media includes dynamic memory, such as system memory 808.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 800. According to other embodiments of the invention, two or more computer systems 800 coupled by communication link 815 (e.g., LAN, PTSN, or wireless network) may perform the sequence of instructions required to practice the invention in coordination with one another.

Computer system 800 may transmit and receive messages, data, and instructions, including program, i.e., application code, through communication link 815 and communication interface 814. Received program code may be executed by processor 807 as it is received, and/or stored in disk drive 810, or other non-volatile storage for later execution. Computer system 800 may communicate through a data interface 833 to a database 832 on an external storage device 831.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
receiving a bump shape at a bump pattern generation tool of an electronic design system;
determining a minimum antiradial pitch between two instances of the bump shape in a same row having an angular relationship greater than zero, wherein the minimum antiradial pitch is determined based on a keep out region for each of the two instances, the keep out region being used to avoid overlap between the two instances of the bump shape;
generating a radial bump pattern specification wherein pitch between adjacent bump shape instances will be greater than or equal to the minimum antiradial pitch; and arranging instances of the bump shape in a radial pattern using the radial bump pattern specification.

2. The method of claim 1, wherein the bump shape comprises a first area corresponding to a substrate footprint, a second area corresponding to a physical bump, and a third area corresponding to a keep out region.

3. The method of claim 1, wherein the minimum antiradial pitch is determined for a plurality of angles.

4. The method of claim 3, further comprising determining a minimum radial pitch between three instances of the bump shape.

5. The method of claim 1, wherein the radial bump pattern specification represents a plurality of rings of instances of the bump shape and a ring comprises one or more rows of the instances of the bump shape where the rows in a respective ring comprise the same respective number of instances of the bump shape.

6. The method of claim 5, wherein a number of rows in the plurality of rings is the same for each ring and the number of rows is a static value.

7. The method of claim 5, wherein a number of rows in the plurality of rings is determined dynamically to optimize bump count per unit of area.

8. The method of claim 5, wherein a first ring of the plurality of rings is shifted towards an inner radius of a second ring of the plurality of rings, and the inner radius of the second ring is greater than an outer radius of the first ring.

9. The method of claim 5, wherein the radial bump pattern specification comprises a relational database table, the relational database table having a first column representing a plurality of radii, a second column representing a number of instances of the bump shape, a third column representing an offset, and a fourth column representing a nudge value, and respective rows of the relational database table representing respective rows of a ring.

10. The method of claim 1, further comprising manufacturing a device corresponding to the radial bump pattern specification.

11. A non-transitory computer readable medium having stored thereon a sequence of instructions which, when executed by a processor performs a set of acts, the set of acts comprising:
receiving a bump shape at a bump pattern generation tool of an electronic design system;
determining a minimum antiradial pitch between two instances of the bump shape in a same row having an angular relationship greater than zero, wherein the minimum antiradial pitch is determined based on a keep out region for each of the two instances, the keep out region being used to avoid overlap between the two instances of the bump shape;
generating a radial bump pattern specification wherein pitch between adjacent bump shape instances will be greater than or equal to the minimum antiradial pitch; and
arranging instances of the bump shape in a radial pattern using the radial bump pattern specification.

12. The computer readable medium of claim 11, wherein the bump shape comprises a first area corresponding to a substrate footprint, a second area corresponding to a physical bump, and a third area corresponding to a keep out region.

13. The computer readable medium of claim 11, wherein the minimum antiradial pitch is determined for a plurality of angles.

14. The computer readable medium of claim 13, further comprising determining a minimum radial pitch between three instances of the bump shape.

15. The computer readable medium of claim 11, wherein the radial bump pattern specification represents a plurality of rings of instances of the bump shape and a ring comprises one or more rows of the instances of the bump shape where the rows in a respective ring comprise the same respective number of instances of the bump shape.

16. The computer readable medium of claim 15, wherein a number of rows in the plurality of rings is the same for each ring and the number of rows is a static value.

17. The computer readable medium of claim 15, wherein a number of rows in the plurality of rings is determined dynamically to optimize bump count per unit of area.

18. The computer readable medium of claim 15, wherein a first ring of the plurality of rings is shifted towards an inner radius of a second ring of the plurality of rings, and the inner radius of the second ring is greater than an outer radius of the first ring.

19. The computer readable medium of claim 15, wherein the radial bump pattern specification comprises a relational database table, the relational database table having a first column representing a plurality of radii, a second column representing a number of instances of the bump shape, a third column representing an offset, and a fourth column representing a nudge value, and respective rows of the relational database table representing respective rows of a ring.

20. A system, comprising:
a bump pattern generation tool of an electronic design system for generating bump patterns by executing a set of acts, the set of acts comprising:
receiving a bump shape at a bump pattern generation tool of an electronic design system;
determining a minimum antiradial pitch between two instances of the bump shape in a same row having an angular relationship greater than zero, wherein the minimum antiradial pitch is determined based on a keep out region for each of the two instances, the keep out region being used to avoid overlap between the two instances of the bump shape;
generating a radial bump pattern specification wherein pitch between adjacent bump shape instances will be greater than or equal to the minimum antiradial pitch; and
arranging instances of the bump shape in a radial pattern using the radial bump pattern specification.

21. The system of claim 20, further comprising determining a minimum radial pitch between three instances of the bump shape, and wherein the minimum antiradial pitch is determined for a plurality of angles.

22. The system of claim 20, wherein the radial bump pattern specification represents a plurality of rings of instances of the bump shape and a ring comprises one or more rows of the instances of the bump shape where the rows in a respective ring comprise the same respective number of instances of the bump shape.

23. The system of claim 22, wherein a number of rows in the plurality of rings is the same for each ring and the number of rows is a static value.

24. The system of claim 22, wherein a number of rows in the plurality of rings is determined dynamically to optimize bump count per unit of area.

25. The system of claim 22, wherein a first ring of the plurality of rings is shifted towards an inner radius of a second ring of the plurality of rings, and the inner radius of the second ring is greater than an outer radius of the first ring.

* * * * *